United States Patent [19]

Huesgen et al.

[11] 4,406,172

[45] Sep. 27, 1983

[54] OVERSPEED TRIP MECHANISM AND METHOD OF ASSEMBLING

[75] Inventors: Eugene L. Huesgen, Jeannette; George P. Walsh, Pittsburgh, both of Pa.

[73] Assignee: Elliott Turbomachinery Co., Inc., Jeannette, Pa.

[21] Appl. No.: 304,424

[22] Filed: Sep. 21, 1981

[51] Int. Cl.³ .................... G05G 15/06; G01P 3/16; F16B 3/00
[52] U.S. Cl. .......................... 74/3; 29/173; 29/526 R; 73/538; 74/100 P; 192/89 B; 200/80 R; 267/161; 403/356
[58] Field of Search ............ 74/3, 100 P; 29/526 R, 29/173; 73/538; 192/89 B; 251/75; 200/80 R; 267/161, 162; 403/356

[56] References Cited

U.S. PATENT DOCUMENTS

| | | | |
|---|---|---|---|
| 3,216,543 | 11/1965 | Schroter | 192/89 B X |
| 3,374,680 | 3/1968 | Geary | 73/538 |
| 3,543,899 | 12/1970 | Colbert | 403/356 X |
| 3,640,363 | 2/1972 | Spalding | 192/89 B X |
| 4,220,231 | 9/1980 | Richter | 192/89 B |
| 4,333,343 | 6/1982 | Czuszak | 74/3 X |

Primary Examiner—Allan D. Herrmann
Attorney, Agent, or Firm—Donald F. Daley; David J. Zobkiw

[57] ABSTRACT

A Belleville spring type of overspeed trip mechanism is made to rotate at the same speed as the shaft by preventing slippage between the spring and the other members of the trip mechanism. Slippage is prevented by forming grooves in the periphery of the interior portion of the spring and using pins which coact with the grooves to prevent rotation of the spring relative to the other members.

3 Claims, 3 Drawing Figures

OVERSPEED TRIP MECHANISM AND METHOD OF ASSEMBLING

BACKGROUND OF THE INVENTION

Trip mechanisms are frequently employed with rotary machines to reduce the speed thereof or to completely terminate the operation of the rotary machine upon the occurrence of an undesirable operating condition such as excessive shaft speed. One type of trip mechanism employs a Belleville spring having a plurality of weights secured thereto and which is mounted on the shaft of the rotary machine so as to rotate therewith. Rotary motion is typically transmitted from the shaft to the Belleville spring through the coaction of an auxiliary spring which is also of the Belleville type and which exerts an axial force on the main spring so as to push it against a support sleeve. This force, along with friction, normally prevents slippage between the main Belleville spring and the shaft. This arrangement does not always work, however. If oil gets onto the assembly and reduces the friction between the parts, slippage can occur. Also, if there is a sudden acceleration, the torque exerted as a result of the acceleration may overcome friction and slippage can occur. If the spring is slipping, it is not rotating at the same speed as the shaft and will not trip at the correct speed.

SUMMARY OF THE INVENTION

The present invention is directed to a Belleville spring type overspeed trip mechanism for a rotary shaft in which relative slippage is prevented between the spring and the shaft. A pair of pins coacts with cutouts or grooves formed in the spring to provide a positive connection between the spring and the support sleeve so that slippage cannot occur without either shearing the pins or deforming the parts.

It is an object of this invention to provide an overspeed trip mechanism which is positively connected to a rotary shaft to prevent slippage.

It is a further object of this invention to provide a simplified overspeed trip assembly which does not require the use of an auxiliary spring or the adjustment of spring tension. These objects, and others as will become apparent hereinafter, are accomplished by the present invention.

Basically, the present invention provides a simplified assembly in which a Belleville spring type overspeed trip mechanism is located on a support sleeve by pins which prevent the relative rotation of the spring with respect to the sleeve. Axial movement of the pins and excess axial movement of the spring beyond that necessary for flexure is prevented by a retaining ring which is secured to the support sleeve.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
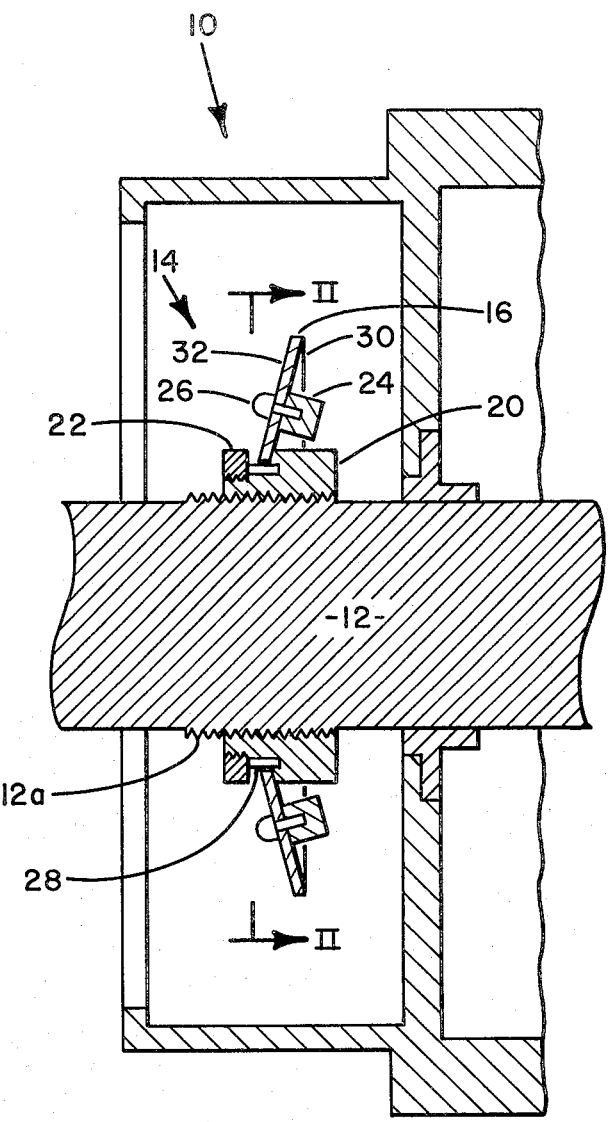
FIG. 1 is a side sectional view taken through a part of a rotary machine showing a trip mechanism constructed in accordance with a preferred embodiment of the present invention.

Referring to the drawings and particularly to FIG. 1, there is illustrated a small portion of a rotary machine 10 such as a turbine. Machine 10 includes a rotatable shaft 12 and a trip mechanism 14. Trip mechanism 14, in turn, includes Belleville spring 16, support sleeve 20, retaining ring 22, a plurality of weights 24, and securing means such as rivets or screws 26. Additionally, a pair of antirotation pins 28 are provided according to the teachings of the present invention.

Figure 2:
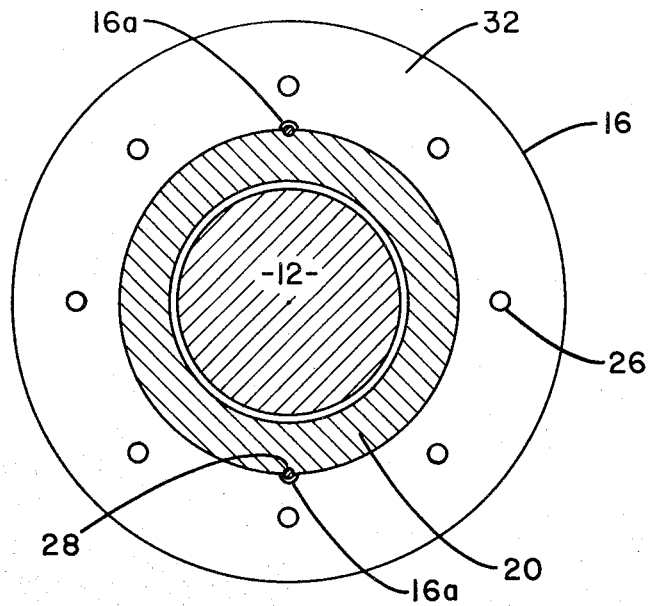
FIG. 2 is a sectional view taken along line II—II of FIG. 1.

As is conventional, Belleville spring 16 is a dished annular member having a normally concave side 30 and a normally convex side 32. Belleville spring 16 and pins 28 are axially positioned between support sleeve 20 and retaining ring 22 with spring 16 extending a considerable radial distance therebeyond. As best shown in FIG. 2, Belleville spring 16 has a pair of diametrically located grooves 16a formed therein which respectively receive a portion of a pin 28 to thereby prevent rotational slippage between spring 16 and support sleeve 20. The inside circumferential edge of Belleville spring 16 which contains cutouts or grooves 16a is axially located between support sleeve 20 and retaining ring 22 and is slightly spaced therefrom. In this manner, sleeve 20 and retaining ring 22 limit axial movement of Belleville Spring 16, while permitting flexure thereof so as to permit the actuation of a switch or the like (not illustrated).

In assembling the trip mechanism 14, a plurality of weights 24 are mounted on concave side 30 of Belleville spring 16 in a symmetrical pattern at equal angular spacings by means of rivets or screws 26 which extend through spring 16 to secure weights 24 thereto. Spring 16 is either placed on sleeve 20 and positioned to permit the insertion of pins 28 past grooves 16a into drilled out recesses 21 in sleeve 20, or else pins 28 are placed in recesses 21 in sleeve 20 and then spring 16 is placed on sleeve and positioned such that grooves 16a are aligned with pins 38 and spring 16 is slid onto pins 28. Next, retaining ring 22 is screwed onto sleeve 20 by the respective engagement of threads 22a and 20a so as to hold pins 28 in place and to limit the axial movement of spring 16 to that necessary for flexure. The assembled trip mechanism 14 is screwed onto shaft 12 by the respective engagement of threads 20b and 12a so as to be integral therewith.

Figure 3:
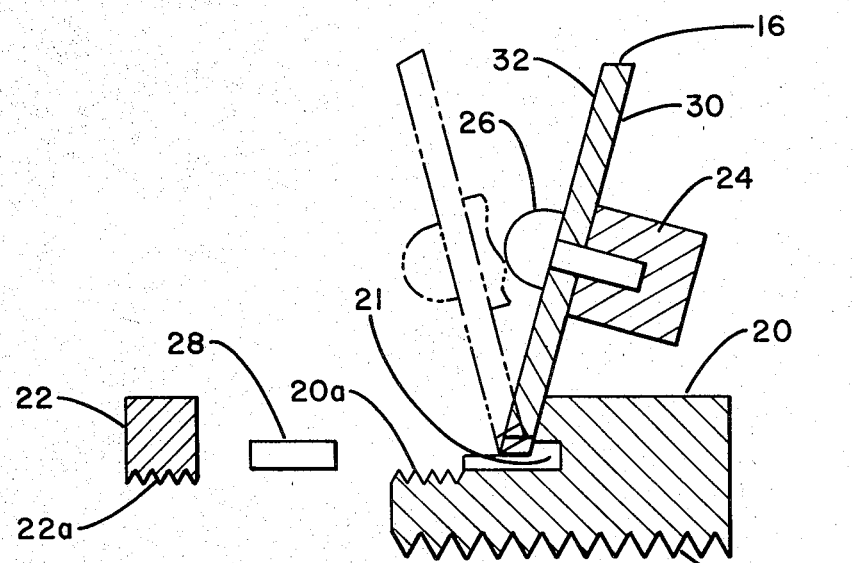
FIG. 3 is a partial exploded view of a portion of the trip mechanism.

With trip mechanism 14 installed on shaft 12, as shaft 12 rotates, weights 24 apply centrifugal forces to Belleville spring 16, causing the spring to stretch radially and deflect toward a vertical, planar position. Spring 16 and weights 24 are so proportioned that, when the rotational speed of shaft 12 exceeds a preset value, the spring 16 will snap overcenter and turn inside out into the position shown in broken lines in FIG. 3. In any one of the many ways well known to those skilled in the art, this snapping action may be employed to actuate a control member such as a valve or a switch to terminate or slow down the rotation of shaft 12. Once shaft speed is reduced below a certain level, Belleville spring 16 snaps back overcenter toward the unstressed position shown in cross section in FIGS. 1 and 3. Because pins 28 prevent slippage or differential rotation between spring 16 and sleeve 20 which is screwed onto shaft 12, the tripping action of trip mechanism 14 is in response to the actual rotational speed of shaft 12.

Although a preferred embodiment of the present invention has been illustrated and described, other changes will occur to those skilled in the art. It is therefor intended that the scope of the present invention is to be limited only by the scope of the appended claims.

What is claimed is:

1. An overspeed trip assembly comprising:
   a Belleville spring consisting of an annular, dished member having a first, normally concave side and a second, normally convex side;
   a plurality of weights secured to said first side at equal angular spacings;
   a pair of diametrically located grooves formed in the inner circumferential edge of said Belleville spring;
   support sleeve means having a first threaded portion for attachment to a rotatable shaft, a generally radially extending portion, a pair of diametrically spaced openings axially extending into said generally radially extending portion, and a second threaded portion axially spaced from said diametrically spaced openings;
   a pair of pins adapted to be received in said pair of diametrically spaced openings and in said pair of diametrically located grooves for preventing relative rotational movement between said Belleville spring and said support sleeve means; and
   retaining means having a threaded portion for engaging said second threaded portion to secure said pair of pins in said pair of diametrically spaced openings and to limit axial movement of said Belleville spring to that necessary to permit flexure of said Belleville spring to an overcenter position due to centrifugal force when the rotational speed of said assembly exceeds a preset value and to permit a return of said Belleville spring to an unstressed position.

2. A method of assembling an overspeed trip mechanism comprising the steps of:
   forming a pair of diametrically spaced grooves in the inner periphery of a Belleville spring;
   securing a plurality of weights to the concave portion of the Belleville spring at equal angular spacings;
   placing the Belleville spring on a support sleeve and preventing relative rotation therebetween by means of pins received in recesses formed in the sleeve and coacting with the spaced grooves;
   securing the pins in the recesses and the Belleville spring on the support sleeve by means of a retaining means screwed to the support sleeve.

3. The method of claim 2 further including the step of screwing the support sleeve onto a rotary shaft.

* * * * *